Figure 1:
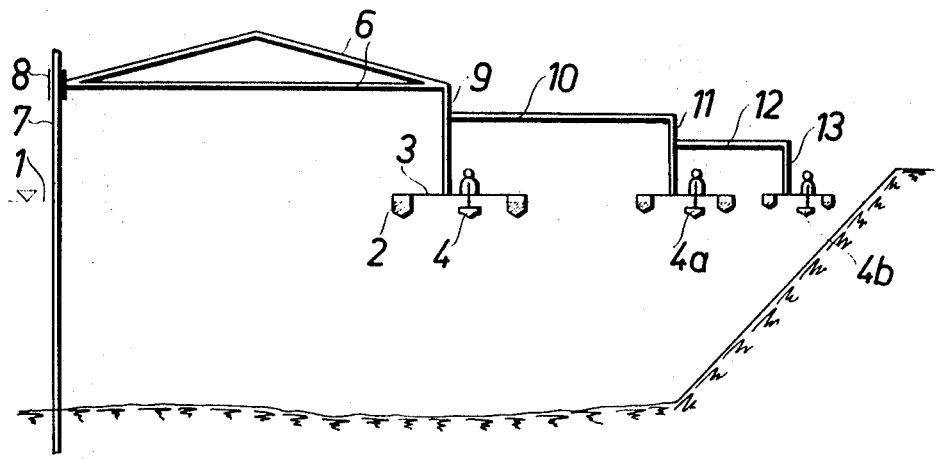

United States Patent

[11] 3,612,489

| [72] | Inventors | Endre Abraham;<br>Laszlo Tasfi, both of Budapest, Hungary |
|---|---|---|
| [21] | Appl. No. | 803,694 |
| [22] | Filed | Mar. 3, 1969 |
| [45] | Patented | Oct. 12, 1971 |
| [73] | Assignee | Vizgazdalkodasi Tudomanyos Kutato Intezet<br>Budapest, Hungary |
| [32] | Priority | Mar. 6, 1968 |
| [33] | | Hungary |
| [31] | | VI 606 |

[54] APPARATUS FOR THE SURFACE AERATION OF STILL AND RUNNING WATERS BY MECHANICAL MEANS
3 Claims, 2 Drawing Figs.

[52] U.S. Cl. .................................................. 259/102, 259/108
[51] Int. Cl. ..................................................... B01f 7/30
[50] Field of Search............................................ 259/7, 8, 95, 96, 107, 108, 6, 23, 24, 43, 44, 102, 103, 104

[56]  References Cited
UNITED STATES PATENTS

| 3,154,601 | 10/1964 | Kalinske........................ | 259/7 |
| 3,235,877 | 2/1966 | Grob ............................. | 259/108 |
| 3,323,782 | 6/1967 | Clough .......................... | 259/96 |
| 3,341,450 | 9/1967 | Ciabattari...................... | 259/96 |

Primary Examiner—Robert W. Jenkins
Attorney—Young & Thompson

ABSTRACT: A mechanical water-aerating device known per se and preferably having a vertical main shaft, is mounted on a float, the latter being connected by means of a rod or cable to a stay fixed in the bed of the water. The rotation of the aerating device causes revolution of the float around the stay so that a large surface of the water is aerated.

PATENTED OCT 12 1971 3,612,489

INVENTORS
ENDRE ÁBRAHÁM
LÁSZLÓ TASFI

BY Young + Thompson
ATTORNEYS

APPARATUS FOR THE SURFACE AERATION OF STILL AND RUNNING WATERS BY MECHANICAL MEANS

The invention relates to a surface aeration apparatus, by means of which the oxygen supply to still and running waters is augmented by mechanical means with the aid of an aerating device with a vertical shaft, for example a turbine.

Industrial or domestic waste waters flowing into still or running waters "load" the live waters in a measure depending on the degree of contamination. Contamination manifests itself as a lack of oxygen, and is measured by the rate of oxygen consumption (expressed in mg./l) by the waste water within a certain period of time. The oxygen amount consumed by the waste water is replaced by natural or artificial methods.

A number of attempts have been made at artificial oxygen supply, for still waters as well as running waters. Of the known arrangements, the stationary, built-in oxygen-feeding devices are not economical and accordingly they are seldom used in practice. The known movable oxygen-feeding apparatuses, for example turbines disposed in motor boats, are also expensive for general use.

The basic idea of the invention is that it is possible to supply oxygen with high efficiency to a very large surface or body of water by means of a single mechanical means for oxygen supply, conveniently a turbine, if said oxygen-supplying means is carried by a float, said float being tied or stayed to a point which is fixed in relation to the bed or bottom of the river or lake, in a manner permitting free revolution of said oxygen-supplying means. With the aid of such an apparatus it is possible to supply oxygen to a water body or surface many times larger than the water body in the immediate vicinity of the oxygen-supplying means, without the need for additional tugging or hauling means, since the revolving turbine is able to cover or aerate a vast area as a result of its circular floating motion. In this way its efficiency is greatly increased.

Figure 2:
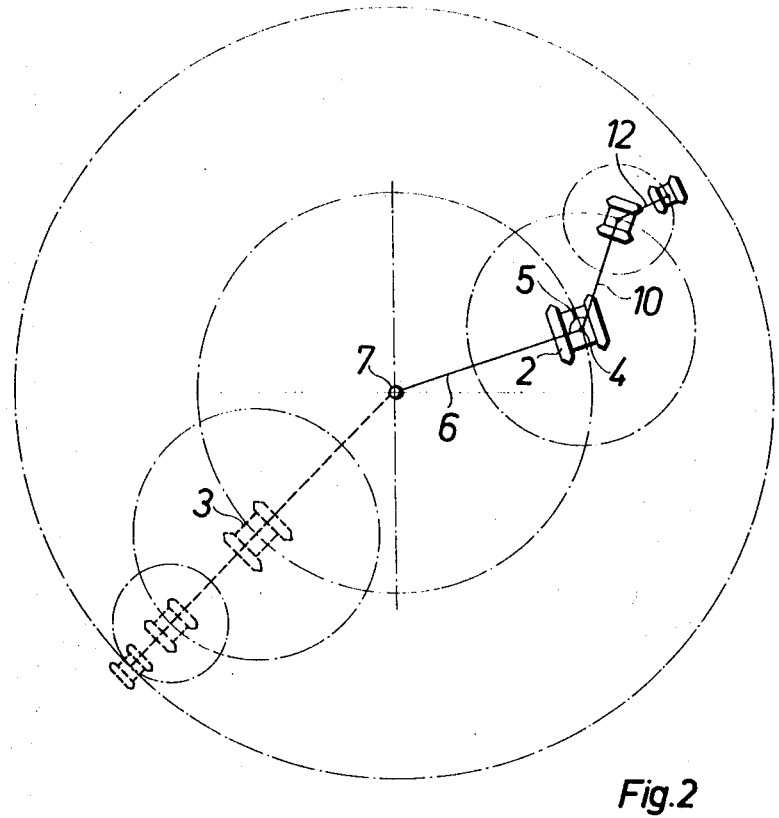

The construction and operation of the apparatus according to the invention is described in detail in connection with an illustrative example thereof, with reference to the accompanying drawing, in which FIG. 1 is a vertical section of a schematic representation, whereas FIG. 2 is a top view.

A known power-driven turbine 4 with a vertical shaft is supported by a bridge member 3 mounted on floats 2 floating on the water surface 1. The bridge member 3 is tied to a pile 7 sunk in the river bed or the bottom of the lake, by means of a system of a vertical rod 9 and horizontal rods 6, with a bearing 8 enabling free revolution. The rod system 6 is preferably pivoted so as to enable its adjustment to the different positions of the bridge member 3 due to the changing water level or to the waves.

If the turbine is driven by an electromotor, power is supplied with the aid of a cable (not shown) led to the pile 7 through a current collector mounted on the horizontal rod system 6.

When the turbine 4 operates, the water surface in the vicinity of the turbine intensely agitated, whereupon the surrounding body of water is filled with oxygen, owing to the known effect of water-aerating turbines. As a result of the rotation of the turbine, the surrounding water body is moved in a direction perpendicular to and helically moving away from the vertical shaft of the turbine. Simultaneously and consequently the turbine water body situated under the turbine is sucked up by the turbine. Owing to this bidirectional motion of the body of water surrounding the turbine, the oxygen introduced into the water by the turbine is conveyed and fed the adjacent water to a great depth.

A reaction force arises from the turbine torque, the horizontal component of which perpendicular to the rod 6 compels the floats 2 together with the bridge member 3 mounted on them, and thus with the turbine, to revolve around the pile 7. The speed of rotation may be adjusted or changed by means of braking members immersed in the water. Owing to the revolution the area of the aerated water body is multiplied without the need for any extra power sources i.e. tugging or hauling equipment. If the turbine 4 is positioned eccentrically in relation to the floats 2 and the bridge member 3 (FIG. 1), the force generating the gyrating motion increases, and a bumper wall 5, against which the agitated water dashes, also generates a reaction force promoting this revolution.

Another important advantage of the apparatus according to the invention is that it lends itself, with a suitable formation of the turbine, to optimum utilization under conditions and circumstances varying within wide ranges. That means that the apparatus may be used in shallow as well as deep waters, and may either stir up the sediment or leave it settled, as desired.

In the embodiment illustrated in the drawing, rods 10 and 11 join the rod 9 holding the bridge member 3 revolving around the pile 7. To the rods 10, 11, further rods 12 and 13 are connected, and the rods 11 and 13 hold a float and an aerating turbine 4a and 4b respectively. This is how the multiple revolution represented in two different positions in FIG. 2 is created. In this embodiment therefore the turbine 4a with its float revolves around the center of the float 2 with epicyclic motion, whereas the turbine 4b, revolving around the float of the turbine 4a, follows the motion of the other two turbines.

What we claim is:

1. Apparatus for the surface aeration of water above a bed, comprising a float that floats on the surface of the water, a mechanical aerating device carried by the float and contacting the water to aerate the water and to propel the float along the surface of the water, said aerating device having an upright rotary drive shaft, said drive shaft being eccentric to the float, a stay fixed to said bed, and means interconnecting the float and the stay for revolution of the float about the stay under the propulsion of the aerating device.

2. Apparatus for the surface aeration of water above a bed, comprising a first float that floats on the surface of the water, a mechanical aerating device carried by said first float and contacting the water to aerate the water and to propel said first float along the surface of the water, a stay fixed to said bed, means interconnecting said first float and the stay for revolution of said first float about the stay under the propulsion of the aerating device, and a second float carrying a further aerating device connected to said first float for revolution of said second float about said first float.

3. Apparatus as claimed in claim 2, said second float having epicyclic movement about said stay.